Figure 1:
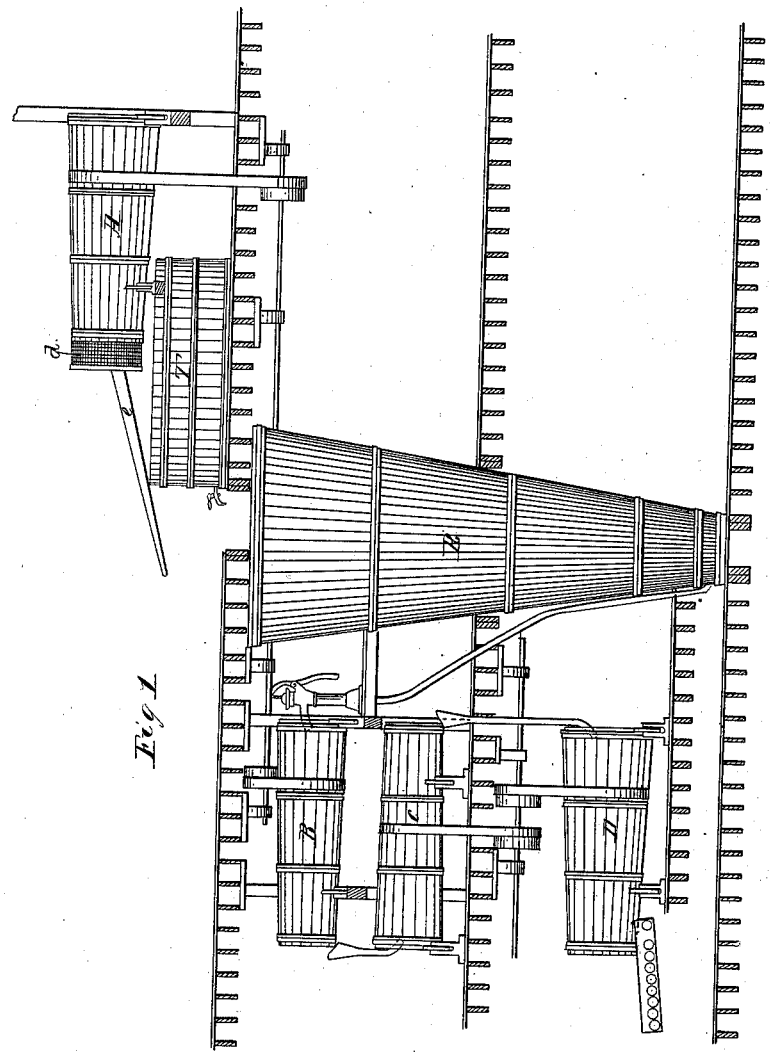
Figure 2:
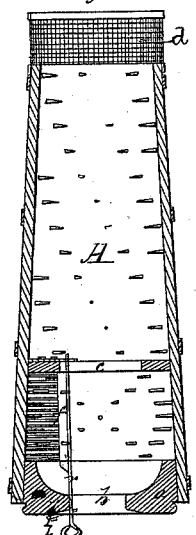
Figure 3:
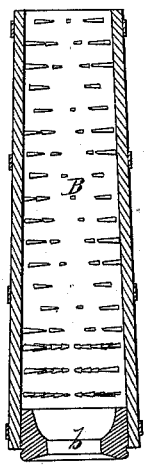
Figure 8:
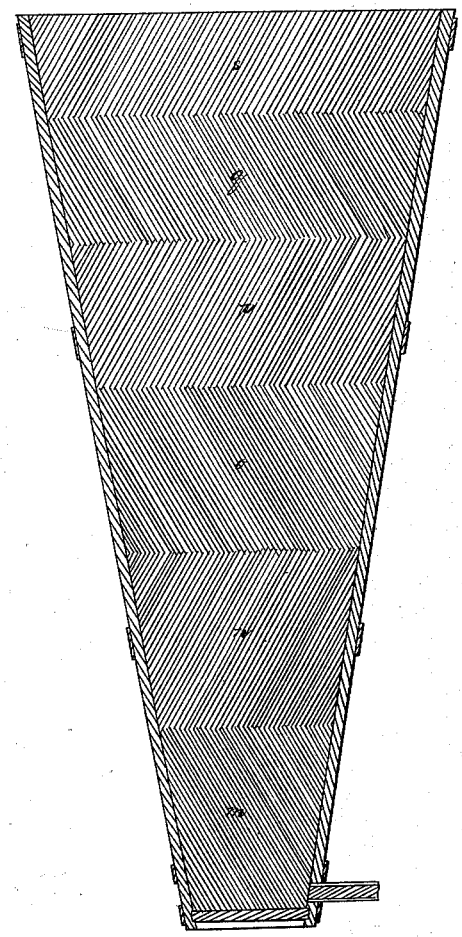
Figure 6:
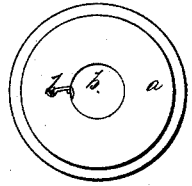
Figure 7:
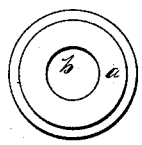
Figure 5:
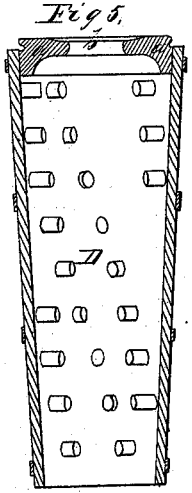
Figure 4:
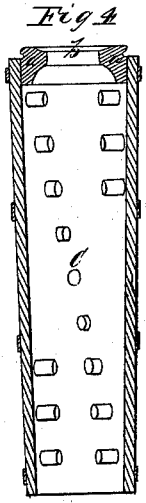
Figure 9:

L. B. Pitcher,
Mortar Mixer.

2 sheets, Sheet 2.

Nº 60,055.   Patented Nov. 27, 1866.

Witnesses,
A. B. Smith
C. W. Smith

Inventor,
Leman B. Pitcher

United States Patent Office.

IMPROVED MORTAR-MILL.

LEMAN B. PITCHER, OF SALINA, NEW YORK.

Letters Patent No. 60,055, dated November 27, 1866.

SPECIFICATION.

TO ALL WHOM IT MAY CONCERN:

Be it known that I, LEMAN B. PITCHER, of the town of Salina, in the county of Onondaga, and State of New York, have invented a new and improved Mortar-Mill and process for making mortar therewith; and I do hereby declare that the following is a full, clear, and exact description of the same, reference being had to the annexed drawings making a part of this specification. The letters used represent corresponding parts wherever they occur.

To enable others skilled in the art to make and use my invention, I will proceed to describe the same, and the process by which mortar is made. I use the term mortar as comprehending all mixtures of lime into plaster or cement for masonry, whether used alone or with sand, or with sand, hair, or other substances together. In the methods of making mortar now in common use, substantially the whole work is performed by hand labor, and although there have been some attempts at labor-saving machinery in this department of industry, it is believed that nothing has been tried as yet which has to any extent become common in its use, or of a character similar to my machinery and process. That I may clearly describe and show the advantages of the machinery and process I employ in making mortars according to my invention, I will first describe the common methods employed, that mine may be the more readily understood.

Lime is sometimes dry slaked, and sometimes slaked in water and then mixed with sand; when hair is to be added, a lime-paste, composed of lime and water, is usually made, into which the hair is mixed. In each case it is usual to partially mix and pile up the compound to remain days, that the lime may cure or perfect its slaking. The mortar thus made and treated is prone to set and harden where the lime just fills the sand, or even when it partially does so, and in so doing injures. When thus mixed the curing of the lime also seriously injures the hair when mixed therein, rendering it tender and often worthless. Again, mortars thus mixed and treated, require rubbing, and grinding, and almost crushing, to reduce the dried lime-paste and the set lime and sand to a pliable and working condition.

The general features of my invention are, that I perform the principal mechanical operations in making mortar by passing the materials through hollow revolving cylinders, slightly conical in shape, with teeth arranged on the inner side, as hereinafter particularly specified, and the process in general terms is substantially as follows:

In giving the outlines of the process, however, I set forth what in my judgment is the best method of carrying through the whole work to completion, without meaning to be understood that it would be necessary to go through with all its parts in every instance. The work will naturally vary somewhat, according to the kinds of mortar made. I take the lime, whether dry slaked or slaked in water, and add enough water to reduce it to a thin paste. In doing this I prevent it from forming into a stiff and tenacious paste, (as it naturally would do,) by keeping it continually rolling and moving in a hollow revolving cylinder, where the process of slaking is carried forward, and from which the dregs are taken and the lime-paste is caused to run off, as fast as it is made, into a vat. I keep the lime-paste in this vat for some hours, that the natural operation of slaking may have time to go on and become as perfect as possible before it is stored in a larger reservoir. As the tendency at this stage of the process is for the heavier unslaked parts of the lime to settle towards the bottom of the vat, thus rendering the lower part of the mass thicker than the upper, after it has thus stood for some hours in the vat, I stir up the whole mass preparatory to storing in the larger reservoir, as above stated. After passing the lime-paste into the larger reservoir, I keep it for days, more or less, that the curing of the lime may be perfected, and that I may preserve the paste moist and ready to be easily worked. This reservoir is made large enough so that I may add further layers of paste from day to day upon the top of that already in the reservoir. I then take the oldest paste, which has become cured, from the bottom of the reservoir, for use, and pass it through a quick-running cylinder filled with sharp teeth, to make it fine, and I add water if required to reduce it to the condition of a half liquid paste. If hair is used I then run the paste in this half liquid state through another cylinder, adding the hair as may be required; and in this cylinder I use blunt teeth to prevent the hair from flocking, and so that it may be fully separated and mixed with the paste. The paste, whether mixed or unmixed with hair, is then run through another cylinder with blunt teeth, adding sand therewith as it is being worked, and water if necessary. Thus I make mortar ready for immediate use, either with or without hair, and in the process do not allow the lime-paste to dry and thus more or less become set and hardened, nor injure the hair, during any part of the process of slaking the lime, nor does the sand become crushed in working the mortar up for use.

The various figures used in the drawings are described generally as follows:

Figure I represents a perspective view of all the different cylinders, vats, pumps, pipes, and other apparatus used in completing the entire operation of making mortar. I do not, however, confine myself to any particular adaptation of the cylinders to other parts that may be useful in performing the operation.

Figure II represents a longitudinal sectional view of the cylinder A, in which the operation of slaking the lime, forming it into a paste, and clearing the dregs takes place.

Figure III represents a like view of the cylinder B, through which the lime-paste is made to pass after being cured, and in which it is worked up and tempered ready to receive the hair or sand, as the case may be.

Figure IV represents a like view of the cylinder C, in which the tempered lime-paste and hair are mixed, when hair is used.

Figure V represents a like view of the cylinder D, in which the tempered lime-paste, with or without hair, is mixed with the sand to make mortar.

Figures VI and VII represent perspective views of cylinder heads.

Figure VIII represents a vertical sectional view of the large reservoir, into which the lime-paste is run after being first slaked in order to stand and cure.

Figure IX is a comb for cleaning the cylinder A of the dregs which accumulate in slaking.

I now describe the making of the several parts.

I make the cylinder A hollow, and the body of it principally of wood, (although it may be made entirely of metal,) in the form of a truncated cone, and when of wood with hoops to band it together. The length should be twelve feet, more or less; the diameter of the large end about four feet, and of the small end about three feet. No precise size, however, is essential in any of the cylinders. Neither are the cylindrical or conical forms absolutely necessary, but I consider them the best. It might be a straight square box or with polygonal sides, but in that case it would be necessary to mount it differently from what I do. I make a head-piece, a, to fit snugly to or into the large end of the cylinder in any manner practicable, with the circular opening, b, of sufficient size to receive the lime and water for slaking; I place a bar, c, on the inside of the cylinder, at a distance from the large end equal to about one-fourth the length of the whole cylinder, to prevent the dregs from passing off with the lime-paste, and retard the flow of the water and lime, until a paste is formed; more or other bars may be added if thought advisable when the lime is of a poor quality, and when of a very good quality the bar, c, might be dispensed with. In this cylinder I use strong teeth of wood or metal, about six inches in length, more or less, to cut and break up the lime. Before the bar, c, the teeth are set in rows diamond shaped, so that the lime, by the revolutions of the cylinder, will have a tendency to be thrown together and then again separated. These should be very strong and not so numerous as beyond the bar. Beyond the bar, c, the teeth are set in diagonal rows across the cylinder, so arranged that while the slaked lime in the form of a paste is carried forward with the water, the dregs, if any pass the bar, c, by the screw motion of the rows of teeth are constantly thrown back. In this part of the cylinder the teeth may gradually be set closer in the rows and diminish in size as the rows approach the outer end. I attach on or in the end of the cylinder the circular or hoop-shaped sieve or strainer, d, arranged on a line with the cylinder to sift the lime-paste, and let the dregs, if any may have reached this point, pass off by means of the spout, e, or in any other manner, as circumstances may require. When the spout, e, is used as represented in the diagram, it should be broad at the upper end so as to catch the dregs brought up by the revolution of the cylinder. For clearing the dregs from the cylinder before the bar, c, I use the comb, f, made with the back attached to the rod, r, running along the back, and extending beyond the teeth, so that it can readily be held to the bar, c, by an eye projecting up or by any other common device, and it may be held at the head by the hook, h, or in any equivalent manner. By the revolutions of the cylinder the dregs will be carried up on the comb, and as it reverses fall over the back of the comb and be readily caught in a shovel. This comb is put in and taken out as often as the cylinder needs cleaning. The whole cylinder being thus complete it is mounted upon friction rollers, arranged as circumstances may require, but so as to make the axis of the cylinder horizontal, or nearly so, and it may be revolved by manual or other motive power, applied in any usual form. The object of mounting in this manner is to enable me to make the cylinder as small as possible to perform the work, and have it free from shafting inside, and to keep the hole, b, clear from obstruction in supplying the lime and water, and also large enough to easily feed the machine and take away the dregs. The water is supplied by any ordinary means through the opening, b, in such quantity as may be necessary, (a steady stream is preferable,) and lime will be supplied by regular feeding as fast as it will slake, or mix when already slaked. The slaked lime will be carried forward with the water in the form of a paste, as above stated, and fall into the tub, T. The principal part of the dregs will be held by the bar, c, and may be taken out when it is required by means of the comb, f, as above stated, and if any dregs pass the bar, c, they will be separated from the paste by means of the sieve or strainer, d. The reason for running it in the tub, T, is this: particles of lime not fully slaked may pass through the sieve, d, and will settle to the bottom of the tub, (expelling most of the water,) where the process of slaking will continue sometimes for hours, rendering the bottom portion of the lime-paste thick and sometimes nearly dry. I do not wish the lime-paste to become thick or dry, therefore, I run it first into the tub, T, to remain there six hours, more or less, where I can stir up and mix it together, so that when it is run in the reservoir, R, it will be again fully mixed, and thus I avoid the paste becoming too stiff in the reservoir, R, when wanted. Ordinarily slaked lime requires about six days more or less, for curing; I therefore make the tub, T, large enough to receive one run of slaking, and then, after stirring up as aforesaid, I draw it off into the reservoir, R, in which is shown by different shadings, m n o p q s, the lime-paste for six different runs of slaking, or it may be drawn off in any common manner in different reservoirs. Care should be taken to prevent the different runs from commingling with each other in the reservoir, R, and to effect this object a float may be used to receive and break the fall of the paste as it is discharged from the tub, T, into the reservoir. The lime-paste may then be drawn from the bottom of the reservoir, R, as fast as it is slaked and cured, and no part of the work need stop to wait for the curing. The next part of the process is to mix the hair when that is used. According to the common method of making mortar, the hair is mixed before the process of curing commences, and the result is that the strength of the hair is greatly injured while the curing proceeds. After the lime-paste is cured, as aforesaid, I draw it from the bottom of the reservoir, R, preparatory to passing it through the cylinder, B, in order to further cut and mix it up, and temper it ready to receive the hair. This cylinder is made in the same general manner as the cylinder A, except that the bar $c$, screw $d$, and comb $f$, are not ordinarily used, (but the screw $d$ may be if further sifting should be necessary.) The teeth are also made sharp in this cylinder and placed thicker in the rows, so as to thoroughly cut the lime, and it should be revolved at a higher speed. The teeth are also placed in the same diagonal manner across the cylinder so as to prevent the heavy or thick paste, if any, from passing off. The lime-paste from the reservoir, R, is pumped or otherwise conveyed into the cylinder through the opening, $b$, and sufficient water supplied when required to temper it, so that it will form a half liquid paste, and be of a proper thickness for use when mixed with the hair or sand. The cylinder B need not be so large as the cylinder A. As the lime-paste comes from the cylinder B, in the half liquid state aforesaid, it is ready for mixing with the hair, and for that purpose the lime-paste, with a suitable amount of hair, is conveyed into the cylinder C in any convenient way. This cylinder is made in the same manner as the cylinder B, except that the teeth should be about one-third the number, more or less, and are made about one inch and one-fourth in diameter, more or less, to prevent the hair from lodging on them and matting or flocking. These teeth are also set diagonally as above described. When the lime paste and the hair are thus mixed, they are conveyed into the larger cylinder, D, and the sand supplied as may be required. More water may be added to properly mix and temper the mortar, if necessary; more or less, according as the sand is moist or dry. The teeth in this cylinder are made and arranged in the same general manner as in cylinder C, and for the same reasons. When hair is not required the lime-paste may be conveyed from the cylinder B, directly to cylinder D, for mixing with the sand, or it may be used in any other manner required. All the cylinders are mounted upon friction rollers, in the same general manner as cylinder A, and arranged for use with reference to each other, according to circumstances, and for the convenience of feeding. By dispensing with the sieve, $d$, after the lime is slaked, a very good machine for common use may be made of cylinder A, alone, mounted as aforesaid, and performing the work by repeating the operations through the same cylinder.

What I claim as my invention, and desire to secure by Letters Patent, is—

The cylinders A B C and D, with or without any of the attachments which form a part of either of them, made and operated substantially as and for the purposes described.

I also claim the mechanical process of making mortar therewith, substantially in the manner described.

LEMAN B. PITCHER.

Witnesses:
H. H. WALPOLE,
N. B. SMITH.